Dec. 29, 1959 P. S. BECKER 2,918,906
VALVE
Filed Nov. 23, 1953 2 Sheets-Sheet 1

Inventor
PHILIP S. BECKER
By Charles L. Lovercheck
Attorney

Dec. 29, 1959  P. S. BECKER  2,918,906
VALVE

Filed Nov. 23, 1953  2 Sheets-Sheet 2

INVENTOR.
PHILIP S. BECKER
BY
Charles L. Lovechich
attorney

# United States Patent Office 2,918,906
Patented Dec. 29, 1959

2,918,906

VALVE

Philip S. Becker, Erie, Pa.

Application November 23, 1953, Serial No. 393,625

6 Claims. (Cl. 121—46.5)

This invention relates to valves and more particularly to valves for use in controlling the flow of air, gas, and liquids.

In valves made according to the previous designs with which I am familiar, parts of the valve were made in such a way that considerable labor was required to construct the valve and the valve was made up of a considerable number of parts. Finishing and assembling the valve constituted a time consuming operation and parts of the valve were inclined to wear out rapidly and were difficult to replace.

It is, accordingly, an object of my invention to overcome the above and other defects in previous valves and more particularly to provide a valve which is simple in design and construction, economical in manufacture, and durable and efficient in use.

Another object of the invention is to provide a valve wherein the body of the valve is made up of one integral section of material.

A further object of my invention is to provide a novel type of valve design which can be constructed as a two way, a three way, a four way, or a five way valve.

Another object of my invention is to provide a valve wherein the shut-off means on the valve is made up of a simple ball of resilient material.

Another object of my invention is to provide a valve wherein the pressure of the flow through the valve will push the actuating member of the valve to an open position and wherein a means is provided to force the actuating member to a closed position.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 4:
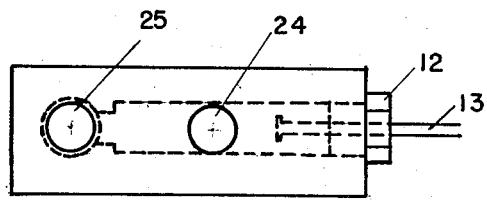
Fig. 4 is a top view of the valve shown in Figs. 1, 2, and 3.
Figure 1:
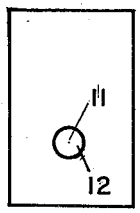
Fig. 1 is an end view of a valve according to my invention.
Figure 3:
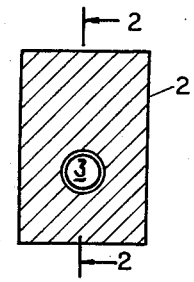
Fig. 3 is a cross sectional view taken on line 3—3 of Fig. 2.
Figure 2:
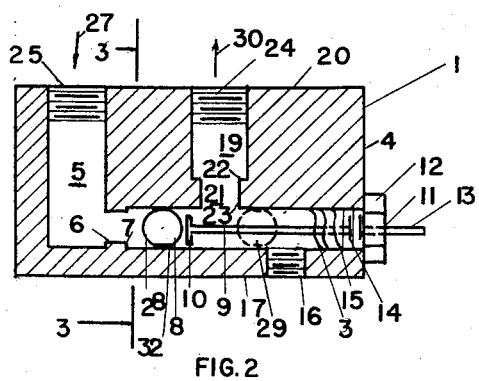
Fig. 2 is a longitudinal cross sectional view taken on line 2—2 of Fig. 3.

Now with more specific reference to the drawings, in Figs. 1 to 4, I show a valve 1 having a body member 2 made up of a solid block. The body member 2 preferably is made of metal but could be made of any suitable plastic or other solid material. A longitudinal hole 3 is bored into the body 2 from the end 4 and connects with the vertical hole 5 through the reduced size opening 6 between the hole 3 and the hole 5. The reduced size opening 6 defines shoulders 7 which cooperate with the resilient ball actuating member 9 to prevent the ball 8 from being forced in the hole 5. The actuating member 9 has a head 10 which engages the ball member 8 and a hole 11 is drilled through the plug 12 to accommodate the handle 13 of the member 9. The plug 12 is threaded at 14 to engage threads 15 on the body member 2.

An exhaust hole 16 extends from the bottom surface 17 of the valve body 2 into and communicates with the hole 3. A hole 19 is bored through the body member 2 from the top surface 20 to communicate with the hole 3 and a reduced size opening 21 defines shoulders 22 and 23 which prevent the ball 8 from being forced up into the opening 21.

The hole 19 is threaded at 24 to receive a pipe fitting or suitable connecting means to connect the valve 1 to an air, gas, or fluid line. The hole 5 is similarly threaded at 25 to receive a pipe fitting.

During operation, a source of fluid under pressure is attached to a fitting to the threaded opening 25 and a device to be operated is attached to the threaded opening 24 and fluid or air is admitted to the hole 5 in the direction of the arrow 27. The air, gas, or liquid, as the case may be, flows through the hole 5, through the reduced size opening 6, and into the hole 3 and engages one side 28 of the ball 8. If no force is being applied to the ball 8 by the actuating member 9, the force of the air on the ball 8 will cause the ball 8 to engage the head 10 and force the handle 13 to move through the hole 11 in the plug 12 and the ball 8 will be moved to the position shown at 29. This will cause fluid to flow from the source through hole 5, through opening 6, through opening 21, and out of hole 19 to the device to be operated. Since the ball 8 is obstructing the flow out of the exhaust port 16, no air will exhaust. If ball 8 is moved to the position 32 shown in Fig. 2 by applying a force to handle 13, the flow of fluid from the source through opening 5 will be stopped and air from the device being operated will exhaust through opening 16, thus relieving pressure in hole 19. This is an example of a three way valve operation of my invention. To make it operate as a two way valve, a plug could be inserted in opening 16, thereby preventing the escape of air when the ball 8 is in the full line position shown. Also, an air seal is required at 11 to prevent air from the device connected to the threaded opening 24 to exhaust through the air seal.

It will be noted that the ball 8 is slightly larger than the hole 3. Because of this fact, the ball 8 is caused to elongate and the edges engaging the hole 3 tend to flatten at 32 so that during operation, the ball 8 is essentially a cylinder or piston. As the ball 8 is forced toward the end 4 by the force of the gas or liquid, it tends to roll in the hole 3, thereby causing the resilient material of the ball 8 to flex and change shape and, thereby, prevent it from taking a permanent set.

Figure 5:
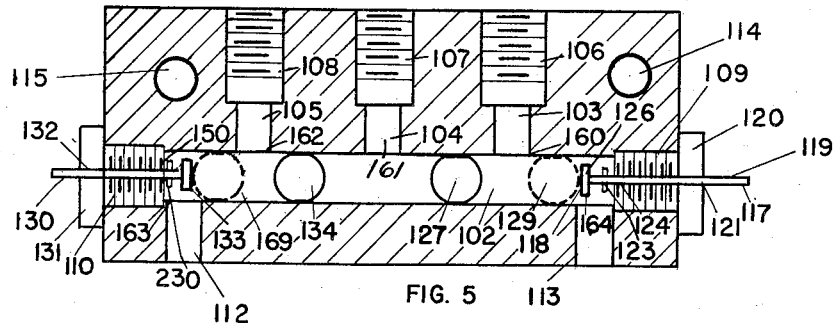
Fig. 5 is a longitudinal cross sectional view of another embodiment of the invention.
Figure 6:
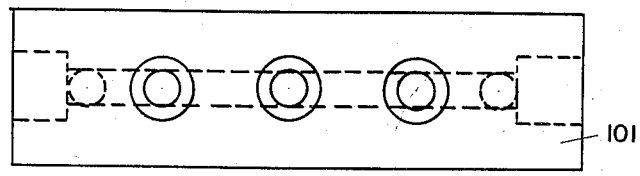
Fig. 6 is a top view of the valve shown in Fig. 5.

As stated above, the valve, according to my invention, can be made in the form of a four or five way valve. In Figs. 5 and 6, I show a valve body 101 having a longitudinal bore 102 therethrough and enlarged counterbored openings 109 and 110 communicating with either end of the longitudinal bore 102 and threaded to receive plugs 120 and 131, respectively.

The plug 120 has a hole 121 therethrough to receive the handle 119 of the actuating device 117. The handle 119 extends through the hole 121 and has a head 126 thereon which engages a ball valve 127. The ball 127 is made of rubber or other resilient material and is of slightly larger diameter than the longitudinal bore 102. In like manner, the plug 131 is threaded into the opening 110 and has a hole 132 therethrough which receives the handle of the actuating member 130. A head 133 is attached to the actuating member 130 to engage the ball 134. A return spring 150 is provided to urge the actuating member 130 into engagement with the ball 134. A shoulder 230 prevents the actuating member 130 from moving beyond the location shown in Fig. 5. The ball must not move outward of opening 112 as this would allow air to blow from the inlet 104 directly to the exhaust. In like manner, the helical spring 123 is disposed to actuate the actuating device 117.

Lateral bores 103, 104, and 105 are provided in the valve and they communicate with the longitudinal bore 102 at 160, 161, and 162, respectively. The bores 103, 104, and 105 are counterbored at 106, 107, and 108, respectively, and threaded to receive fittings to connect the valve to a pipe or other device. Exhaust ports 112 and 113 are arranged in the opposite side of the valve from the bores 103, 104, and 105 and they communicate with the longitudinal bore 102 at 163 and 164, respectively.

During operation, the threaded counterbore 107 will be connected to a source of compressed air and the counterbores 106 and 108 may be connected to individual devices to be operated. The ports 112 and 113 may be connected to a reservoir into which the device is to exhaust or they may exhaust into the ambient air. When the balls 127 and 134 are in the dotted line position 129 and 169, respectively, the air will flow under pressure from bore 104 through bore 102 through bore 105 to the device connected to the threaded counterbore 108 and will also flow through the longitudinal bore 102 through the bore 103 to the device connected to the counterbore 106. When one device, for instance, the device connected to counterbore 108, is to be shut off, the actuating member 130 is moved toward the ball 134 in the position 169 to move it into its full line position. This will cut off the flow of air from the source connected to the counterbore 107 and allow the air which is under pressure in the device connected to counterbore 108 to flow through the longitudinal bore 102 and exhaust through the port 112. In order to turn on the device connected at 108 again, the force on the handle of the actuating member 130 is relieved and air pressure from the source connected to counterbore 107 will force the ball 134 to the dotted line position 169, thereby allowing air to flow to the device connected to source 108.

In like manner when it is desired to close off the device connected to the counterbore 106, the handle 119 forces the ball 127 from the dotted position 129 to the full line position. This will allow the air compressed in the device connected to the counterbore 106 to exhaust through the port 113 into the ambient atmosphere. To turn on the device connected to the counterbore 106 again, the force on the handle 119 is relieved and air pressure from the source connected to counterbore 107 will force the ball 127 to the dotted line position 129, thereby again allowing air to flow to the device connected to counterbore 106 and obstructing the flow of air through the exhaust port 113.

Figure 7:
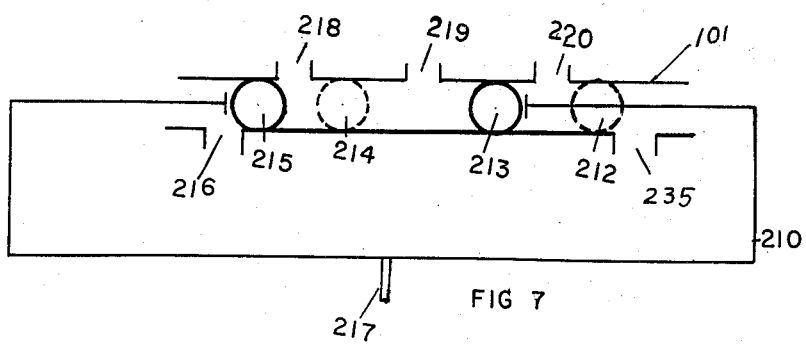
Fig. 7 shows a valve having an operating mechanism thereon for operating the balls simultaneously.

In Fig. 7, I show a schematic diagram of the valve shown in Fig. 5 wherein the operating members are interlocked together by the linkage 210 so that when the linkage 210 is in the position shown in Fig. 7, the balls 213 and 215 will be in the position shown in full lines and air will be admitted from source 219 to operate a device connected to aperture 218. At the same time, air will be prevented from flowing from source 219 to a device connected to the connection 220 being intercepted by the ball 213. Therefore, air will exhaust from device 220 through the exhaust port 235. When the linkage 210 is moved to the right to move the balls to the dotted line positions 212 and 214, air will exhaust from device 218 through exhaust 216 and will flow from source 219 to the device 220.

By connecting the actuating members together by the link 210, the air pressure pushing outward against the ball valves 213 and 215 is balanced through the interlocking linkage 210 so that the outward force of the air does not have to be overcome by the operator in order to move the balls.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body member, a longitudinal cylindrical bore through said body member, a plurality of spaced first lateral bores communicating with said longitudinal bore at spaced points along said longitudinal bore, and a resilient ball of larger diameter than said longitudinal bore and forming sealing engagement with the inner periphery of said longitudinal bore disposed in said longitudinal bore and disposed between each first lateral bore and the first lateral bore adjacent thereto whereby air from each first lateral bore is sealed against flow through another lateral bore, said balls being made of resilient material and movable from between said lateral bores to permit air to flow from one lateral bore to another lateral bore.

2. The valve recited in claim 1 wherein an operating mechanism engages each ball to move said balls from a position between said bores, said mechanism being integrally connected together.

3. The valve recited in claim 1 wherein second lateral bores are formed in said valve body communicating with said longitudinal bore whereby air sealed against flow from one said first lateral bore flows through one said second lateral bore.

4. A valve comprising a body, a longitudinal cylindrical bore in said body, two spaced lateral bores communicating from outside said body with said longitudinal bore, said spaced bores constituting an outlet and an inlet bore, a laterally extending exhaust port in said body spaced from said outlet and said inlet bore and communicating outside said body and with said longitudinal bore, and a resilient ball in said longitudinal bore of larger diameter than said bore and forming sealing engagement with the inner periphery of said longitudinal bore between said outlet and inlet bores forming a seal therebetween whereby fluid is directed from said outlet bore through said exhaust port, and an actuating member disposed in said longitudinal bore and extending outwardly therefrom, said actuating member having a handle attached thereto whereby said actuating member and said ball may be moved to a position between said exhaust port and said outlet bore whereby fluid may be directed from said inlet to said outlet bore.

5. The valve recited in claim 4 wherein said valve has a second spaced outlet bore, said inlet bore being spaced between said first outlet bore and said second outlet bore, and a second resilient ball is disposed in said longitudinal bore between said inlet and said outlet bores, said second resilient ball being movable from between said inlet bore and said second outlet bore to direct the flow of fluid from said inlet bore to said second outlet bore.

6. The valve recited in claim 5 wherein a second exhaust port is formed in said valve communicating with said longitudinal bore, said exhaust port being adapted to exhaust fluid from said second outlet bore when said second resilient ball is moved to a position between said inlet and said outlet bores.

(References on following page)

References Cited in the file of this patent

UNITED STATES PATENTS

| | | |
|---|---|---|
| 266,273 | Dennert et al. | Oct. 14, 1882 |
| 557,720 | Teahen | Apr. 7, 1896 |
| 1,259,858 | Hague | Mar. 19, 1918 |
| 1,382,315 | Philippi | June 21, 1921 |
| 1,456,050 | Benbow | May 22, 1923 |
| 1,959,336 | Bast | May 22, 1934 |
| 2,054,464 | Johnson | Sept. 15, 1936 |
| 2,314,860 | Lenin | Mar. 23, 1943 |
| 2,644,426 | Moore | July 7, 1953 |
| 2,724,555 | Roetter | Nov. 22, 1955 |

FOREIGN PATENTS

| | | |
|---|---|---|
| 561,698 | Great Britain | 1944 |